July 28, 1925.  1,547,893
F. BERGIUS
METHOD OF TREATING PRODUCTS OF HYDROLYSIS OF CELLULOSE
Filed Sept. 3, 1921
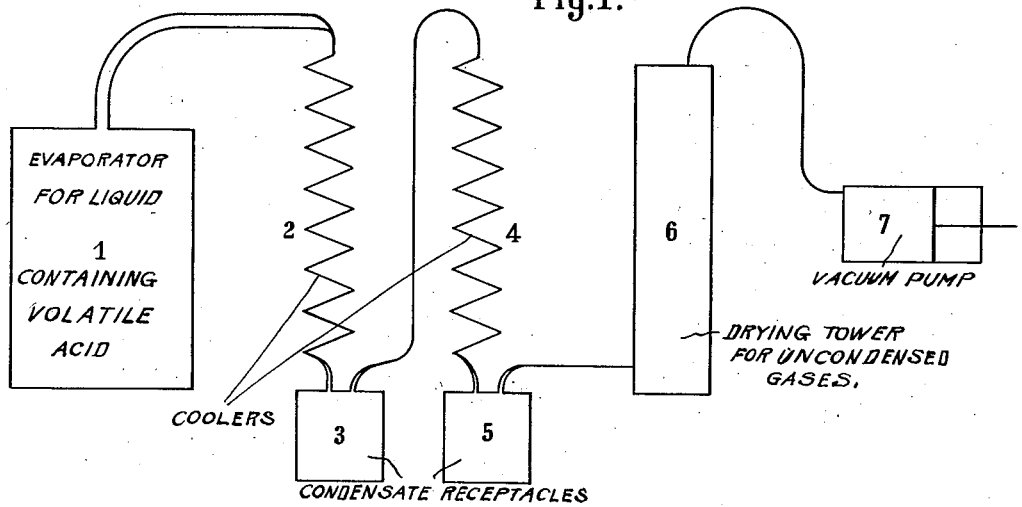
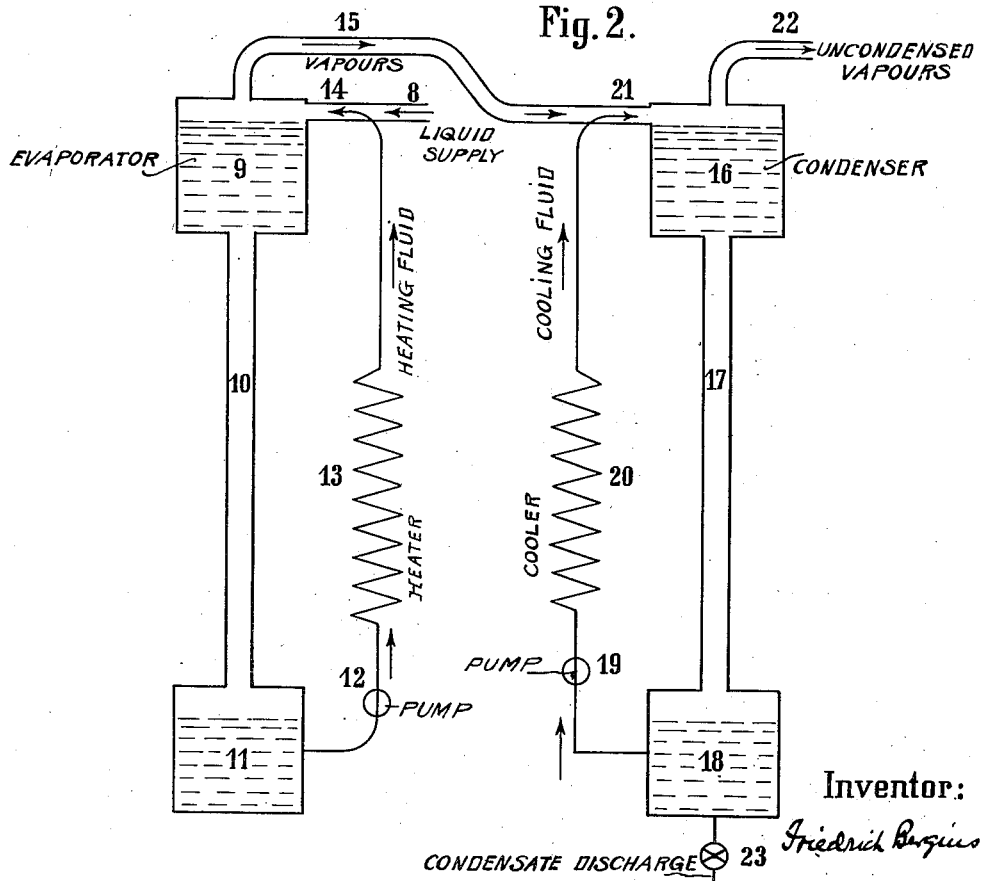
Inventor:
Friedrich Bergius
by Byrnes Townsend Bickerton Patented July 28, 1925.

1,547,893

UNITED STATES PATENT OFFICE.

FRIEDRICH BERGIUS, OF BERLIN, GERMANY.

METHOD OF TREATING PRODUCTS OF HYDROLYSIS OF CELLULOSE.

Application filed September 3, 1921. Serial No. 498,540.

*To all whom it may concern:*

Be it known that I, FRIEDRICH BERGIUS, a citizen of the German Republic, residing at Berlin, Germany, have invented certain new and useful Improvements in Methods of Treating Products of Hydrolysis of Cellulose (for which I have filed applications in Germany, September 14, 1916; Sweden, June 15, 1920; Hungary, June 23, 1920; Norway, June 26, 1920; and Finland, August 1, 1920), of which the following is a specification.

In the manufacture of sugar by hydrolyzing saw dust and other cellulose containing material with concentrated hydrochloric acid, sugar solutions are obtained which contain large quantities of hydrochloric acid and therefore require removal of the acid. The removal of the acid offers great difficulties arising from the fact that hydrochloric acid in presence of water strongly attacks metals, so that it would not be advisable to subject the liquids to distillation in metallic apparatus. On the other hand it would hardly be practicable to work large quantities of sugar solutions in acid proof apparatus. This is especially true if it is intended to effect the distillation of the liquid under reduced pressure produced by the suction of a vacuum pump, as is advisable in order to avoid destroying of the sugar by excessive heat.

Now this invention consists in a method for safely treating such hydrochloric acid containing sugar solutions and other aqueous liquids containing volatile acids may it be hydrochloric acid or other volatile acids such as sulfurous acid, formic acid etc. The essence of the invention consists therein that the distillation of the liquid is conducted in such a manner that nowhere is acid gas allowed to come into contact with metallic parts of the apparatus in the presence of water vapour.

Figure 1 shows a diagram of a distilling plant allowing realization of a method of treating liquids in accordance with the invention.

Figure 2 shows likewise merely diagrammatically a preferred arrangement for distilling liquids in question and for condensing again the condensable products of distillation.

Referring to Fig. 1 the numeral 1 designates a suitably heated evaporator for the acid-containing sugar or other solution. 2 and 4 are two coolers the former preferably operated with water as cooling medium and the latter with highly cooled vapours. 3 and 5 are receptacles for the condensates formed in coolers 2 and 4 respectively. 6 is a drying tower fed with sulfuric acid and 7 a vacuum pump of any usual construction.

Under the action of the vacuum pump 7 hydrochloric acid and water are driven off from the sugar solution in boiler 1 at comparatively low temperature so that decomposition of the sugar is avoided. In coolers 2 and 4 nearly all water and, dissolved therein, a part of the acid are condensed so that only small traces of water together with hydrochloric acid reach the drying tower 6, wherein the water is completely absorbed so that only absolutely dry hydrochloric acid reaches the vacuum pump. This is in no way objectionable because dry hydrochloric acid does not attack and destroy metallic objects. It is of special value that the process yields hydrochloric acid in gaseous form which can advantageously be used in the process of hydrolyzing wood for producing fresh portions of sugar solution.

In Fig. 1 it is not shown how the distillation of the sugar or other acid solution can advantageously be effected and how the condensation of the vapours is accomplished. Fig. 2 shows an arrangement for effectively and economically effecting in a cyclic manner the distillation as well as the condensation.

In Fig. 2 the numeral 8 designates a feeding tube for the acid sugar or other solution. 9 is an earthenware receptacle which is connected with a further receptacle 11 by a tube 10. Tube 10 and receptacle 11 are preferably likewise made of stony material. The receptacles 9 and 11 are connected by a conduit comprising a pump 12 and a heating coil 13, the said conduit ending at its upper end in a nozzle 14 within feeding tube 8. The exit tube for the evolved vapours is designated 15. This tube 15 leads to a receptacle 16 which is connected by tube 17 with a further receptacle 18. Receptacles 16 and 18 are also connected with each other by a bye-pass conduit containing a pump 19 and a cooling coil 20. The bye-pass conduit ends at its upper end in a nozzle 21 within vapour tube 15. The non-condensed gases escape through conduit 22. Hydrochloric acid solution is drawn off through valve 23.

Receptacles 16, 18 and tube 17 are made of stony material whereas cooling coil 20 is made of metal. Conduit 22 is preferably connected with the suction side of a vacuum pump and in this case a drying tower is provided in front of the pump in the same way as indicated in Fig. 1.

Assuming that hydrochloric acid containing sugar solution is under treatment and distilled under the action of a vacuum pump connected to conduit 22 the operation of the device of Fig. 2 is as follows: Receptacles 11 and 18 are filled with a liquid such as oil which has the property of not forming a homogeneous mixture with water and which practically does not absorb hydrochloric acid. This being done the pumps 12 and 19 and the vacuum pump are started and sugar solution allowed to run through conduit 8. The preferably hot oil from receptacle 11 is driven through heating coil 13 and on leaving nozzle 14 is intimately mixed with the sugar solution in conduit 8 so as to evaporate water and hydrochloric acid which take their course through conduit 15. The mixture of sugar and oil passes through tube 10 and the two components are separated from each other by their difference in gravity. The oil is again driven through heating coil 13 and reheated therein and used for evaporating fresh quantities of water and acid whereas the molten sugar is drawn off.

If it should be found that the heat carrying oil is not sufficiently free from water a drying device such as a tower filled with calcium chloride may be inserted in the circulation conduit. In this way it is possible to protect the heat exchange coil 13 from coming into contact with moist acid; this makes it possible to employ heat exchange devices of good heat conductivity such as metallic coils, whereby heat transmission is much facilitated. The presence of some acid within the oil does not materially affect the durability of iron heat exchange devices.

The vapours escaping through conduit 15 are intermixed with cold oil injected therein through nozzle 21. This effects condensation so that a mixing or emulsion of oil and aqueous acid solution enters receptacle 16, whereas hydrochloric acid gas with some non-condensed water vapour escape through conduit 22. On passing through tube 17 the components of the emulsion separate from each other and the aqueous acid solution can be drawn off through valve 23 whereas the oil is again driven through heat exchange coil 20 where it is cooled down and thereby made fit to condense further portions of water and acid. Also in this case a drying tower may be provided to protect the coil 20 from coming into contact with moist acid.

It appears that the components of the raw sugar solution are separated from each other in this way and besides acid free sugar an aqueous solution of hydrochloric acid and gaseous hydrochloric acid are obtained.

A great advantage of the invention resides therein that it allows to effect the heat exchange which is necessary for the evaporation of the water and acid and for the condensation of the vapours outside the acid proof receptacles 9, 10, 11, 16, 17, 18 within metallic heat exchange devices 13, 20 which even with small dimensions have high efficiency.

Of course, it is not necessary to effect as well the evaporation of water and acid as the condensation by circulating a heat carrying liquid; without departing from the spirit of invention it would be possible to employ this method of proceeding only for the one or the other purpose.

What I claim is:—

1. In a method of treating products of hydrolysis of cellulose containing volatile acids the step of evaporating water and volatile acid by intermixing the products to be treated with a heat carrier which is liquid at working temperature and which has the property of not forming a homogeneous mixture with the products under treatment and of practically not absorbing the volatile acid contained therein.

2. In a method of treating products of hydrolysis of cellulose containing volatile acids the step of cyclically intermixing the products to be treated with a heat carrying liquid which has the property of not forming a homogeneous mixture with the products under treatment and of practically not absorbing the volatile acid contained therein so as to vaporize water and volatile acid of the products under treatment and of separating off the heat carrying liquid from the resulting mixture and reheating it in a heat exchanging apparatus of good heat conductivity before again intermixing it with a fresh portion of products to be treated.

3. In a method of treating hydrochloric acid containing products of hydrolyzing of cellulose the step of cyclically intermixing the liquid to be treated with oil in heated condition so as to vaporize water and hydrochloric acid, separating off the oil from the cellulose reaction products and reheating the oil in a metallic heat exchange device before again intermixing it with fresh portions of the cellulose reaction products.

4. Method of treating products of hydrolysis of cellulose containing volatile acids consisting in vaporizing water and acid from the products under treatment by application of heat intermixing the vapour with a cooling liquid having the property of not forming a homogeneous mixture with water so as to effect condensation and separating off the cooling medium from the condensed liquid.

5. Method of treating products of hydrolysis of cellulose containing volatile acids consisting in vaporizing water and acid from the products under treatment by application of heat, intermixing the vapour with a cooling liquid having the property of not forming a homogeneous mixture with water so as to effect condensation, separating off the cooling medium from the condensed liquid, recooling it in a heat exchange device of good heat conductivity and using the recooled liquid for condensing further quantities of vapour.

6. Method of treating hydrochloric acid containing products of hydrolyzing of cellulose consisting in vaporizing water and hydrochloric acid by heat application intermixing the vapour with cooled oil so as to produce condensation separating the oil from the condensed liquid recooling it in a metallic heat exchange device and using the recooled oil for condensing further portions of vapour.

7. Method of treating hydrochloric acid containing products of hydrolyzing of cellulose consisting in intermixing the liquid to be treated with heated oil so as to vaporize water and acid and bringing the produced vapor into contact with cooled oil so as to produce condensation, the oil used for heating and for cooling being separated off from the formed mixings and regenerated in temperature for repeated use by means of metallic heat exchange devices.

8. Method of treating hydrochloric acid containing products of hydrolyzing of cellulose consisting in intermixing a current of the liquid to be treated with a current of heated oil so as to produce vaporization of water and acid, bringing the produced vapour into contact with cooled oil so as to produce condensation, subjecting the non-condensed products to the action of a vacuum pump and drying them by a water absorbing medium before they reach the vacuum pump, the oil for vaporization and for condensation being separated off from admixed components and used again after regeneration in temperature by means of metallic heat exchange devices.

In testimony whereof I affix my signature in presence of two witnesses.

DR. FRIEDR. BERGIUS.

Witnesses:
    FRITZ VON BURRHARD,
    FRITZ RUHL.